United States Patent [19]

Matsuo et al.

[11] 4,046,525

[45] Sept. 6, 1977

[54] METHOD FOR ADSORBING HARMFUL SUBSTANCE

[75] Inventors: Tatsuki Matsuo; Teruo Kohata, both of Otsu, Japan

[73] Assignee: Toyobo Co., Ltd., Osaka, Japan

[21] Appl. No.: 600,788

[22] Filed: July 31, 1975

[30] Foreign Application Priority Data

Feb. 26, 1975 Japan .................................. 50-24393

[51] Int. Cl.$^2$ ........................................... B01D 53/00
[52] U.S. Cl. .......................................... 55/59; 55/179;
55/302; 55/316; 55/387; 55/390; 55/486;
55/527
[58] Field of Search ........................................ 55/33-35,
55/59-62, 179-181, 74, 316, 302, 351, 354, 390,
387, 486, 527; 210/502

[56] References Cited

U.S. PATENT DOCUMENTS

| | | | |
|---|---|---|---|
| 2,617,986 | 11/1952 | Miller | 55/181 |
| 3,504,483 | 4/1970 | Tamura et al. | 55/180 |
| 3,944,403 | 3/1976 | Simpson et al. | 55/387 |

FOREIGN PATENT DOCUMENTS

| | | | |
|---|---|---|---|
| 1,221,549 | 2/1971 | United Kingdom | 55/35 |
| 1,301,101 | 12/1972 | United Kingdom | 55/74 |
| 1,376,888 | 12/1974 | United Kingdom | 55/316 |

*Primary Examiner*—Bernard Nozick
*Attorney, Agent, or Firm*—Birch, Stewart, Kolasch and Birch

[57] ABSTRACT

A method for adsorbing harmful substance comprising at least two adsorptive units composed of a plurality of cylindrical or bag-shaped adsorptive elements made of a cloth-like or sheet-like adsorptive material having a 0.1 m/second pressure loss of not more than 15 mm Aq/cm, said adsorptive material consisting predominantly of active carbon fibers having an equilibrated adsorption amount of benzene of not less than 300 mg/g and an adsorption rate constant of benzene of not less than 0.2 /minute, and the ratio of the area of said adsorptive material to the area of the unit frame being not less than 2, and at any one of said adsorptive units, when used for desorbing the adsorbed harmful substances, a heated purging gas jetting device being provided at the upper part of the adsorptive unit.

6 Claims, 11 Drawing Figures

METHOD FOR ADSORBING HARMFUL SUBSTANCE

The present invention relates to an apparatus for adsorbing harmful substances. More particularly, it relates to an apparatus for adsorbing harmful substances which are contaminating gases and desorbing the adsorbed harmful substances, wherein the adsorption of harmful substances and the desorption of the adsorbed harmful substances are carried out by sequential switchover.

Among the adsorptive materials used for absorbing harmful substances are those made of the granular active carbon which have been in wide use. In the case of the granular active carbon adsorptive materials, however, in order to secure the life of the adsorptive materials (period during which sufficient adsorbing function is retained) to a length practically required, either the pressure loss of the adsorptive materials may become large or the unit frame must be made into a large area. There are also known adsorptive materials made by binding a cloth-like material of a nonwoven fabric and an urethane foam with a powdery or granular active carbon by means of an adequate adhesive. However, it is technically difficult to bind the cloth-like material with the active carbon without losing the function of the active carbon, and also the above known compositions frequently cause problems by the scaling off of active carbon. Since all sorts of these adsorptive materials generally have a small adsorption rate, the thickness of the so-called breakthrough zone becomes large, so that if it is intended to preserve a sufficient rate of removal of the harmful substances, either the pressure loss becomes large or the unit frame area must be made large.

Generally, the performance of the adsorptive unit is ruled mainly by the life (time till the adsorptive capacity is saturated) and the pressure loss. Larger life and smaller pressure loss are desirable for performance. When the ratio of the life to the pressure loss is taken, the larger the ratio the better the performance. In the conventional active carbon unit, generally the pressure loss is increased according to the extension of the life, so that the ratio of the life to the pressure loss cannot be a large value.

The life of an adsorptive unit is given by the following equation:

$$\text{Life} = \frac{(\text{Equilibrated adsorption amount}) \times (\text{Weight per unit area of adsorptive material})}{(\text{Flow rate of harmful gas per unit area of adsorptive material})} \times \left(1 - \frac{\text{Thickness of breakthrough zone}}{\text{Thickness of adsorptive material}} \times f\right) \quad (I)$$

wherein $f$ is the non-adsorption rate in the thickness of breakthrough zone, being about 0.5.

In the above equation (I), the large equilibrated adsorption amount, small harmful gas (substance) flow rate per unit area of adsorptive material, and small thickness of breakthrough zone are the factors to conribute to the extension of the life. If the adsorption rate constant is large, the thickness of breakthrough zone decreases and thereby the thickness of the layer of the adsorptive materials can be made small, so that the pressure loss is also decreased. Further, if the flexibility of the adsorptive material is preserved, it becomes easy to increase the ratio of the area of the adsorptive material to the area of the unit frame (hereinafter referred to as "frame/adsorptive material area ratio"). To increase the frame/adsorptive material area ratio means to reduce the harmful gas flow rate per unit area of adsorptive material, the pressure loss, and the thickness of breakthrough zone. These effects act one another in a multiplied manner.

On the other hand, in case of an apparatus wherein one of the plural (two or more) adsorptive units is used for adsorbing the harmful substances (i.e. harmful gas components) and another one thereof is used for desorbing the adsorbed harmful substances, which is carried out by sequential switchover, i.e. the unit used for the adsorption and the unit used for the desorption are in turn used for the desorption and the adsorption, respectively, the treating capacity (the harmful substances adsorption capacity) of the apparatus is shown by the following formula:

$$\text{Treating capacity} \propto \frac{A_u}{t_{op}} \quad (II)$$

wherein $A_u$ represents the adsorption volume of the harmful substances (the weight of the adsorbed harmful substances per one adsorptive unit during one operation, and $t_{op}$ represents the operation time for the switchovers.

The operation time for the switchovers ($t_{op}$) is controlled by the regeneration time ($t_d$) (i.e. the time necessary for desorbing the adsorbed harmful substances and thereby regenerating the adsorptive unit). That is, when the regeneration time ($t_d$) is smaller, the operation time for the switchover ($t_{op}$) is smaller and then the treating capacity of the apparatus is improved. In other words, it is preferable to reduce the regeneration time as possible.

Under the circumstances, the present inventors have intensively studied to find an improved adsorptive unit having a large ratio of the life to the pressure loss and being easily regenerated, and have found a specific adsorptive unit having improved characteristics and useful for adsorbing harmful gas components.

An object of the present invention is to provide an apparatus for adsorbing harmful substances which contaminate gases.

Another object of the invention is to provide an apparatus containing a plurality of adsorptive units which are used for the adsorption of harmful substances contained in gases and the desorption of said adsorbed harmful substances, respectively, by sequential switchover.

A further object of the invention is to provide an apparatus for adsorbing harmful substances and desorbing the adsorbed harmful substances wherein the adsorption and desorption of the harmful substances are carried out easily and economically.

A more further object of the invention is to provide a method for adsorbing and removing harmful substances from gases contaminated with harmful substances by using an adsorptive unit.

A still further object of the invention is to provide an adsorptive unit useful for adsorbing harmful gas components.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The apparatus for adsorbing the harmful substances of the present invention comprises two or more adsorptive units composed of one or more cylindrical or bag-shaped adsorptive elements made of a cloth-like or sheet-like adsorptive material having a 0.1 m/second pressure loss of not more than 15 mmAq/cm, said adsorptive material consisting predominantly of active carbon fibers having an equilibrated adsorption amount of benzene of not less than 300 mg/g and an adsorption rate constant of benzene of not less than 0.2 /minute, and the area of said adsorptive material being not less than twice the area of the unit frame, wherein one of the adsorptive units is used for adsorbing the harmful substances and another one is used for desorbing the adsorbed harmful substances by forcibly passing the heated purging gas through the adsorptive layer in the other adsorptive unit, which are carried out by sequential switchover. In the present apparatus, the desorption may be carried out by covering up the one or more openings of the cylindrical or bag-shaped adsorptive element and then jetting the heated purging gas from the upper part of the cover into the adsorptive element. The desorption may be preferably carried out at a fixed position (section) of the apparatus, that is, after the adsorption of the harmful substance. The adsorptive unit containing the harmful substances adsorbed therein is moved to a fixed position (section), where a heated purging gas jetting device is provided, and then the adsorbed harmful substances are desorbed from the said adsorptive unit by passing a heated purging gas through the adsorptive element therein.

The adsorptive unit of the present invention is composed of active carbon fiber having a specified adsorptive capacity which is arranged so as to satisify the specified conditions, wherein the ratio of the life to the pressure loss is more than 100 times that of the ordinary granular active carbon under the multiplied effect of the specified capacity and the specified conditions. The above adsorptive unit has effective adsorptive capacity for various harmful substances including ozone, sulfur dioxide, carbon dioxide, nitrogen dioxide, benzene, aldehydes, amines, mercaptan, PCB, gasoline, etc. The adsorptive unit has a rather inferior adsorbability to carbon monoxide, nitrogen monoxide, and inert gas, but still it has a remarkable adsorptive effect in comparison with the conventional active carbons. The above adsorptive unit also has the feature of facilitating the regeneration treatment in comparison with the conventional active carbon adsorptive materials, etc. The regeneration treatment, which is an operation for desorbing the harmful substance once adsorbed, is normally effected by applying a temperature sufficient to evaporate the harmful substances as a gas. In the case of the conventional active carbon adsorptive material, a certain amount of time (for example, 80 minutes) is necessary to have the heated air or steam penetrate into the inside of the active carbon to give sufficient regeneration. However, in the case of the above adsorptive unit of the present invention, the regeneration progresses extremely rapidly, so that it is possible to reduce the regeneration time ($t_{op}$).

BRIEF DESCRIPTION OF THE DRAWINGS:

The present invention will become more fully understood from the detailed description given hereinbelow and the accompanying drawings which are given by way of illustration only, and thus are not limitative of the present invention, and wherein.

The terms used in the pesent specification are explained below.

1. Equilibrated adsorption amount of benzene

The equilibrated adsorption amount of benzene is measured in accordance with JIS-K 1412, and the value thereof is indicated in mg/g. The sample is used in an amount of 0.1 - 0.2 g.

2. Adsorption rate constant of benzene $k$(minute$^{-1}$)

It is calculated from the variation (breakthrough diagram) of the leakage concentration C (ppm) against the time $t$ when the nitrogen stream containing 500 ppm of benzene is passed through the adsorptive layer of 20 mm in thickness at the rate of 0.15 m/sec., by the following equation:

$$\ln \frac{500}{500 - C} = kt \tag{III}$$

wherein $k$ is the adsorption rate constant, $t$ is the time (minute) and C is a concentration (ppm) of benzene, and the constant $k$ requires to have a value of not less than 0.2 /minute, preferably not less than 0.6 /minute.

3. Cloth-like or sheet-like adsorptive material consisting predominantly of the active carbon fibers The adsorptive material is made of the nonwoven fabric, knitted or woven fabric, etc. consisting of not less than 50% by weight of the active carbon fibers. From the viewpoint of air permeability, nonwoven fabric having uniform thickness (needle-punched fabric, or the like) is desirable.

4. Frame/adsorptive material area ratio (R)

The frame/adsorptive material area ratio, i.e. the ratio of the area of the adsorptive material to the area of the unit frame is made not less than 2. The frame/adsorptive material area ratio: R is shown by the following equation:

$$R = \frac{\text{Surface area of cloth-like or sheet-like adsorptive material fitted to unit frame}}{\text{Area of unit frame}} \quad \text{(IV)}$$

Figure 1:
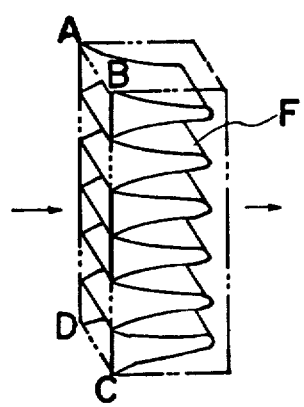
FIG. 1 shows the area of the frame to which the adsorptive material is fitted.
Figure 3:
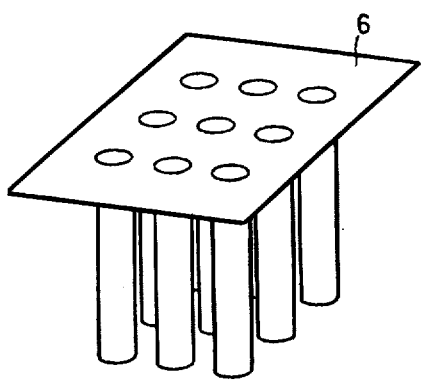
FIG. 3 shows a plurality of adsorptive elements fixed to an adsorptive element supporting plate.
Figure 10:
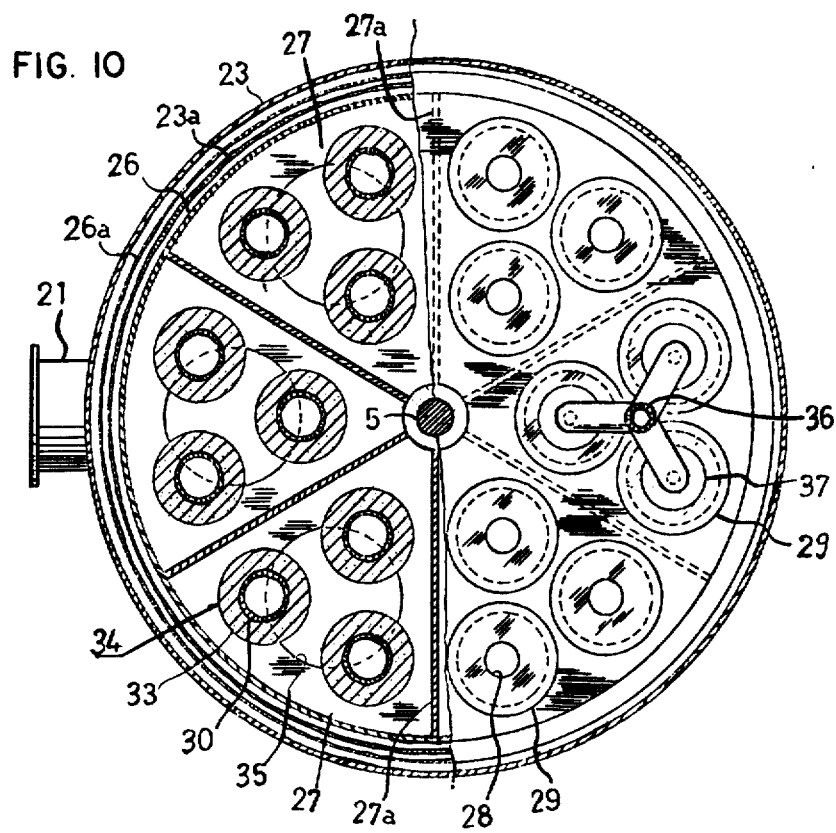

The area of the unit frame means the sectional area in the orthoganal direction to the flow of the gases contaminated with the hamful substances to be treated, and for instance, it is the area defined by A, B, C and D shown in FIG. 1, the area of the adsorptive element supporting plate 6 shown in FIG. 3, and the sectional area of each fan-shaped section shown in FIG. 10.

5. 0.1 m/sec. pressure loss

The 0.1 m/sec. pressure loss is the difference between the pressure per the adsorptive material of 1 cm in thickness which is produced by passing air of 20° C through the adsorptive material at a linear velocity of 0.1 m/sec. and the pressure before such passing. When the fineness of the composing fibers is smaller, the pressure loss becomes larger, and on the other hand, when the specific volume of the adsorptive material is increased, the pressure loss is decreased. Moreover, the pressure loss is effected by the state of the fibers composing the adsorptive material, and therefore, it is difficult to specify the conditions for making the pressure loss not more than 15 mm Aq/cm.

It is important to make the 0.1 m/sec. pressure loss not more than 15 mm Aq/cm, particularly not more than 12 mm Aq/cm, from viewpoint of reducing the burdens of the airblast fan or the exhaust fan which is used for passing the air through the adsorptive unit.

The active carbon fibers havig the specific adsorbability as above can be produed by incorporating the starting fibers such as cotton, hemp, regenerated cellulose fiber, polyvinylalcohol fiber, acrylic fiber, aromatic polyamide fiber, cross-linked formaldehyde fiber, lignin fiber, phenolic fiber, petroleum pitch fiber, etc. with an adequate flame-retarding agent, followed by subjecting the resulting fibers to a flame retarding treatment at a temperature not exceeding 400° C in an adequate atmosphere, and converting the fibers into active carbon at a temperature of not less than 500° C. The preferred material fibers are cellulosic fibers, particularly polynosic fiber, in reflection of the high physical properties (strength, etc.) of the active carbon fiber obtainable therefrom and the possibility to provide the above adsorbability at comparatively low activating temperature. High tenacity of the fiber is important to make the active carbon fiber less liable to collapse into dusts.

As the flame retarding agent, generally the compounds containing phosphor, nitrogen and halogen atoms are preferred, and for application particularly to cellulosic fibers, suitable compounds are $H_2PO_4$, $(NH_4)_2HPO_4$, tetrakis (hydroxymethyl) phosphonium salt, $ZnCl_2$, $CoCl_2$, etc. The said flame retarding agent may be mixed in the starting fiber or adhered to the surface of the fiber by aftertreatment.

The atmosphere in which the flame retarding treatment is made is preferably an inert gas (e.g. nitrogen, combustion gas, etc.) but may contain oxygen to some extent.

The carbon activating treatment is carried out by heating the fiber to a temperature of not less than 500° C at the atmosphere which contains 10 – 70% by volume of steam, carbon monoxide and carbon dioxide. In this case, the fiber may first be impregnated with an adequate activating auxiliary, or the carbon fiber produced in accordance with the conventional process may be activated in accordance with the above method. It is also possible to activate the starting fiber and then to form it into a cloth-like or sheet-like adsorptive material, but generally it is preferred, from the viewpoint of facility for formation of cloth-like or sheet-like adsorptive material, to activate the cloth-like or sheet-like starting fiber.

The adsorptive material of the present invention has comparatively loose cloth or sheet structure in order to make the adsorption capacity large and the pressure loss small. To prevent the active carbon fiber from scaling off under the local excessive pressure exerted by the current of air, etc., the adsorptive material may be used with an adequate reinforcing material laid thereon. The reinforcing material is required to have sufficiently lower pressure loss than that of the adsorptive material and have sufficient tenacity for reinforcement. Such a material may, for example, be a comparatively coarse nonwoven fabric or a coarse wire fabric. Also, the adsorptive material may contain an adequate catalyst.

The structure of the adsorptive unit of the present invention is explained in more detail below with reference to the accompanying drawings.

Figure 2:
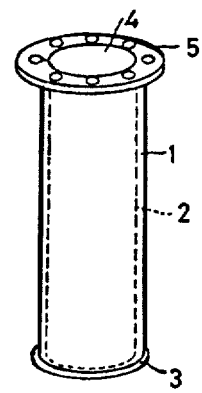
FIG. 2 is a perspective view of one embodiment of the adsorptive element containing a sheet of active carbon fibers attached thereto.

FIG. 2 is a perspective view of one embodiment of the adsorptive element wherein a sheet of active carbon fibers is fitted. In FIG. 2, the sheet 1 made of active carbon fibers is piled on a wire fabric 2 to form a cylindrical adsorptive element, one end of which is closed with a blank circular disc 3 and another end of which is provided with a frame 5 for fixing the adsorptive element to an adsorptive element supporting plate. As shown in FIG. 3, a plurality of adsorptive elements may be fixed onto an adsorptive element supporting plate 6 to form one adsorptive unit. The harmful substance containing air to be cleaned is led from outside of the sheet 1 into the inside of the cylindrical adsorptive element, and when the air passes through the sheet 1, the harmful substance is adsorbed by the active carbon fibers, and then the cleaned air is led out from the opening 4 of the cylindrical adsorptive element, which procedure may be carried out reversely.

Figure 4:
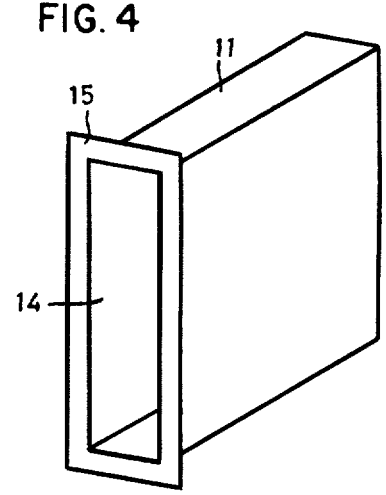
FIG. 4 is a perspective view of another embodiment of the adsorptive element of the present invention.

FIG. 4 is an oblique view of another embodiment of the adsorptive element wherein the sheet made of active carbon fibers is formed to a bag-shape 11. The bag-shaped adsorptive element 11 may be also piled inside or outside with a wire fabric as in FIG. 2 or may be a self-supporting bag-shaped material, which is also provided with a frame 15 and is fixed to an adsorptive element supporting plate to compose an adsorptive unit like in FIG. 3. By using the bag-shaped adsorptive element, the harmful substance containing air is treated likewise, that is, the air is passed through the bag-shaped adsorptive element 11, and then the harmful substance is adsorbed by the active carbon fibers and the cleaned air is exhausted from the opening 14 of the bag-shaped adsorptive element. In the present invention, other shapes of adsorptive elements may be used and further the fixing manner thereof may be optionally varied.

In the present invention, a means for desorbing the adsorbed harmful substance, i.e. a heated purging gas jetting nozzle is provided in addition to the adsorptive unit. The heated purging gas is forcibly blown into the inside of the cylindrical or bag-shaped adsorptive element, and then the temperature of the adsorptive material is raised and the adsorbed harmful substance is desorbed from the adsorptive material, whereby the adsorptive element is regenerated. In this case, the preferred shape of the adsorptive element is cyrindrical or baggy, because the heat of the heated purging gas is efficiently utilized for raising the temperature of the adsorptive material.

The heated purging gas may be saturated steam, superheated steam, heated inert gas, heated air, or the like. However, when the material to be desorbed is explosive or combustible, it is preferable to avoid the use of air, particularly oxygen-containing gas.

Figure 5:
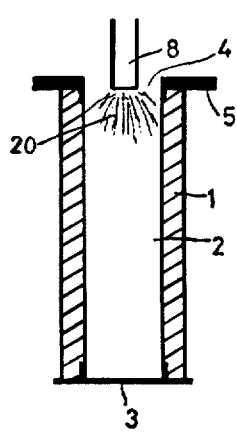
FIG. 5 and 6 show a jetting nozzle for a heated purging gas positioned inside and outside the adsorptive element, respectively.
Figure 6:
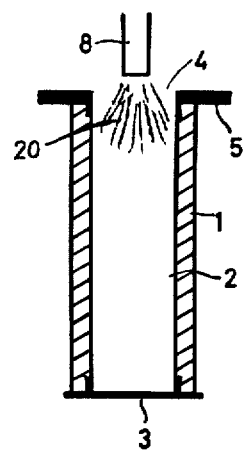
Figure 7:
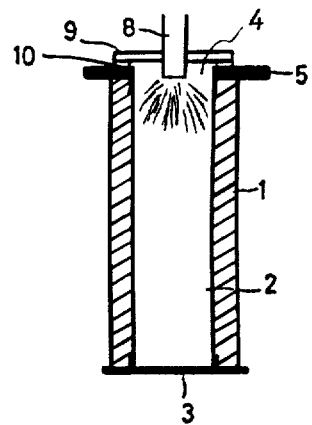
FIG. 7 is similar to FIG. 5 with the further addition of a sealing means for preventing a back-flow from the adsorptive element.

The jetting nozzle 8 may be positioned optionally inside or outside of the adsorptive element, that is, it may be inserted into the inside of the adsorptive element as shown in FIG. 5, or may be outside of the opening 4 of the adsorptive element as shown in FIG. 6. However, for preventing the back-flow and the dissipation of the purging gas from the opening 4, it is preferable to seal the opening 4 with a cap 9 and a packing 10 as shown in FIG. 7. Besides, the plural openings of the plural adsorptive elements may be covered by a single cap, and the purging gas may be jetted into the inside of the adsorptive elements from the upper part thereof. Anyway, the jetting nozzle is set so that the heated purging gas 20 used for the desorption is jetted into inside of the adsorptive element, and thereby the purging gas is forcibly passed through the sheet 1 and then exhausted outside and the adsorptive material is heated. The flow direction of the heated purging gas used for the desorption is preferably in the reverse of the flow of the harmful substance containing air for the adsorption (i.e. the flow of the air led from outside of the sheet into the inside of the adsorptive element and then exhausted from the opening 4 to outside).

Thus, by forcibly passing the heated purging gas through the adsorptive element, the whole of the adsorptive sheet is effectively heated, and therefore, the loss of the heat can be minimized and further the time required for the desorption can be shortened.

The present invention provides an apparatus for treating the gases contaminated with harmful substances utilizing the above adsorptive unit, which comprises arranging at least two adsorptive units, wherein the gases contaminated with harmful substances are charged into the adsorptive units, where they are mutually exchanged, and the adsorbed, harmful substances are desorbed from the harmful substances-adsorbed adsorptive unit.

Specific embodiments of the present apparatus are illustratively shown below with reference to the accompanying drawings.

Figure 8:
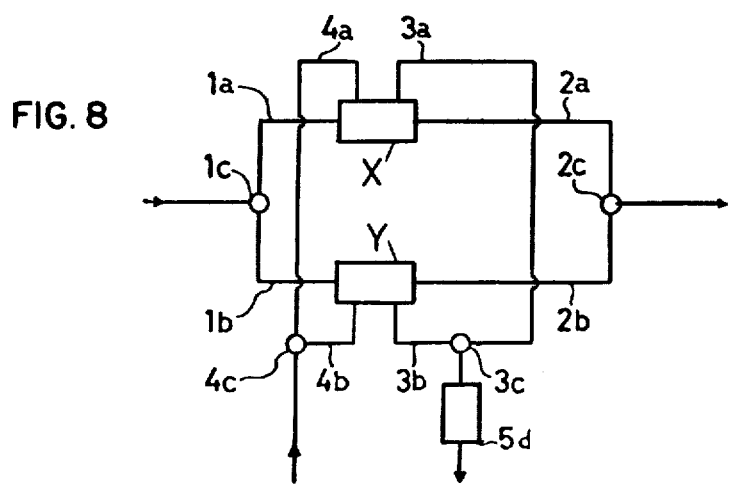
FIG. 8 shows one embodiment of the flow arrangement according to the present invention.

FIG. 8 shows an arrangement of one embodiment of the present apparatus. In FIG. 8, two adsorptive units X and Y are arranged, and to the adsorptive units X and Y are connected the gases contaminated with harmful substances supplying pipes 1a and 1b, the cleaned gas pipes 2a and 2b, the harmful gas pipes 3a and 3b, and the steam pipes 4a and 4b, respectively, and each of the pipes is provided with switch valves 1c, 2c, 3c and 4c which are used for the switchover of the passing way of the gases, and further a harmful gas combustion device 5d is provided at the lower of the switch valve 3c for the harmful gas pipes 3a and 3b.

While the gases contaminated with harmful substances are treated along the lines: the supplying pipe 1a, the adsorptive unit X and the cleaned gas pipe 2a, the harmful gas pipe 3a and steam pipe 4a connected to the adsorptive unit X are closed by the switch valves 3c and 4c, and on the other hand, the supplying pipe 1b and the cleaned gas pipe 2b connected to the adsorptive unit Y are closed and the harmful gas pipe 3b and the steam pipe 4b are opened, and thereby the harmful substance adsorbed by the adsorptive unit Y is desorbed by heating the adsorptive unit Y with the steam led via the steam pipe 4b and subsequently is burnt in the harmful gas combustion device 5d to give harmful gas which is exhausted to the atmosphere.

In the above procedure, the desorption may be carried out by using a heated air at 60° to 150° C instead of the steam.

The apparatus of the present invention is not limited to the switchover system wherein two adsorptive units are arranged, but may be fixed system of plural adsorptive units. For instance, a number of adsorptive units may be arranged so that they rotate around a vertical shaft as shown in FIGS. 9 and 10.

Figure 9:
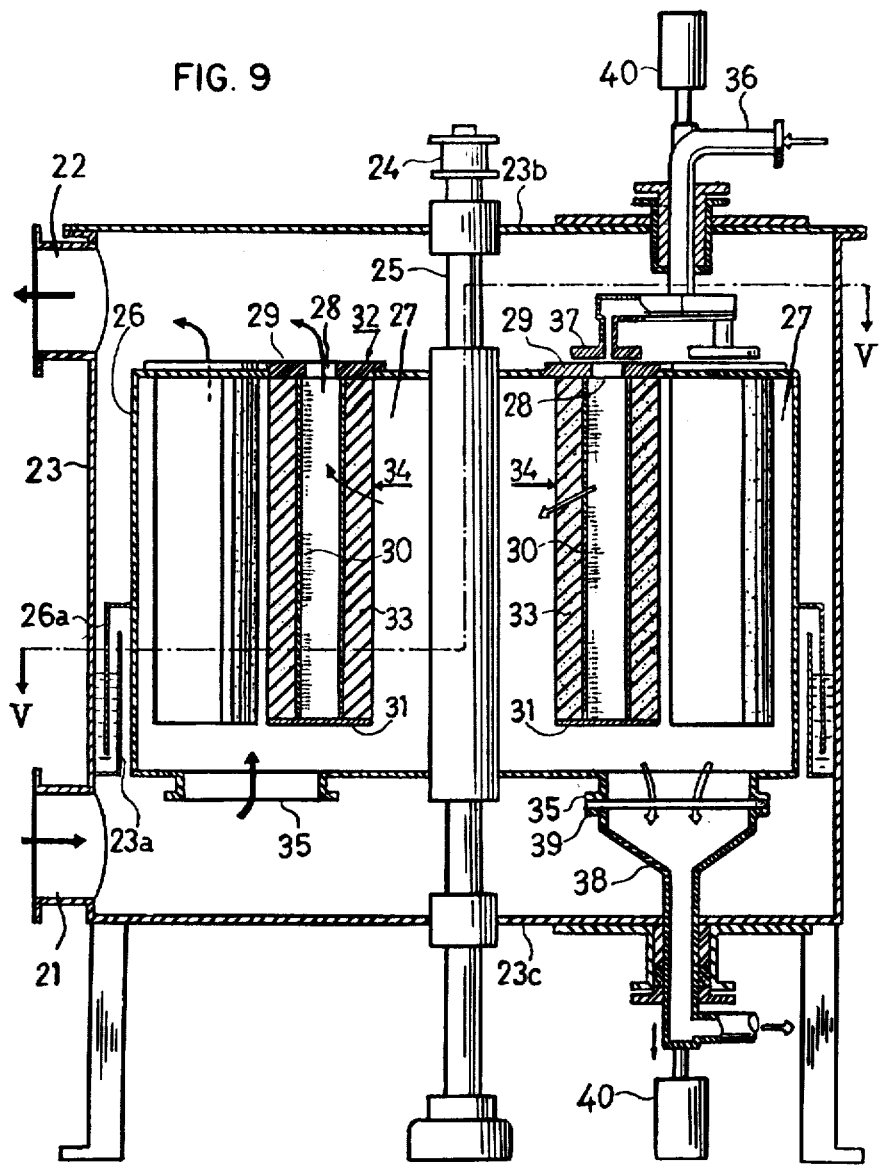
FIGS. 9 and 10 show a plurality of adsorptive units arranged so that they rotate around a vertical shaft.

In FIGS. 9 and 10, the cylindrical casing 23 having a gas inlet 21 and a gas outlet 22 is provided with a cylindrical rotary member 26 fixed to the rotary shaft 25 which is supported vertically at the upper and the lower part thereof and intermittently rotates with the driving pulley 24. In the water-containing upward gutter formed with the inside plate 23a provided on the inner peripheral surface of the above casting 23, an outer plate 26a provided on the outer peripheral surface of the rotary member 26 is inserted to keep the upper surface and the lower surface of the rotary member 26 airtight with respect to one another.

The cylindrical member 26 is equally divided into six adsorptive units 27 by means of the partition boards 27a extending radially from the rotary shaft 25. Each adsorptive unit 27 is provided with three adsorptive elements 34, each of which includes an adsorptive element supporting member 32 which is composed of a flange 29 having a gas outlet hole 28, a cylindrical wire fabric 30 and a bottom plate 31, and an adsorptive material 33 is fitted to the outer surface of the said wire fabric 30. On the lower surface of the adsorptive unit 27 a gas circulation port 35 is provided.

On the upper part of one of the adsorptive unit 27 in the condition where the above rotary member 26 is stopped, there is provided a steam pipe 36 for desorbing the harmful gas which penetrates the upper plate 23b of the casing 23 in a state freely movable frictionally and airtight. The lower part of the said steam pipe 36 is branched into three pieces, and, provided at the lower end of each branch pipe is a steam pipe flange 37 which closely contacts with the flange 29 of the above adsorptive element 34. There is also provided on the position corresponding to the above steam pipe 36 a desorbed gas discharge pipe 38 which penetrates the lower plate 23c of the casing 23 in a state freely movable frictionally and airtight, and on the upper end of the desorbed gas discharge pipe 38 a discharge pipe flange 39 which closely contacts with the flange of the gas circulation port 35 of the rotary member 26. The above steam pipe 36 and desorbed gas discharge pipe 38 are respectively provided with the oil pressure cylinders 40, 40 for moving them up and down.

According to the above apparatus the gases contaminated with harmful substances are treated as follows. The gases contaminated with harmful substances are introduced through the gas inlet 21 into the lower part of the casing 23 and flows into the wire fabric 30 from the outer surface of the adsorptive material 33 of the three adsorptive elements 34 in each adsorptive unit 27. The harmful substance is adsorbed and removed by the adsorptive material 33, ad the resulting clean gas is led out from the outlet 22 through the gas discharge port 28. At this time, in one of the other adsorptive unit 27, close contacts are made between the steam pipe flange 37 and the flange 29 of the adsorptive element 34, and also between the discharge pipe flange 39 and the flange of the gas circulation port 35 by the action of the oil pressure cylinder 40. The harmful substance adsorbed in the adsorptive material 33 is desorbed by the steam introduced into the wire fabric 30 from the steam pipe 36 and then discharged from the desorbed gas discharge pipe 38. When the fixed time comes, the steam pipe 36 and the desorbed gas discharge pipe 38 rises and descends respectively by the actions of the oil pressure cylinders 40, 40 to release their close contact, and the rotary member 26 is rotated one adsorptive unit 27 by means of the driving pulley 24. The steam pipe 36 and the desorbed gas discharge pipe 38 are brought into close contact in the upward and the downward directions of the succeeding adsorptive unit 27, and then, the adsorption and the desorption of the harmful substance are carried out in a like manner.

Figure 11:
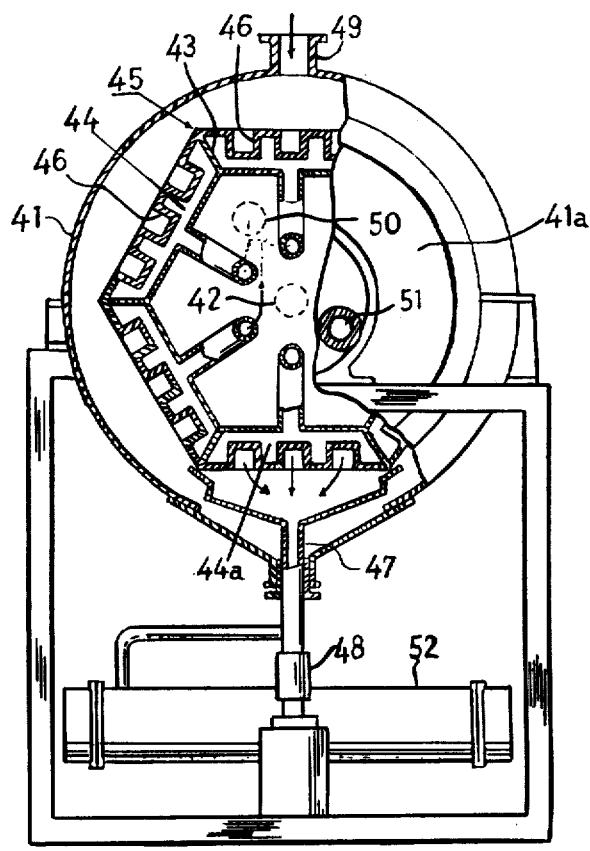
FIG. 11 shows another embodiment of the present invention wherein a rotary member is divided into a plurality of adsorptive units and is operatively associated with a rotary shaft.

FIG. 11 shows another embodiment of the present apparatus, in which a rotary member 45, having a hexagonal shape in vertical section, divided into six adsorptive units 44 by means of the partition plates 43, is fitted to the rotary shaft 42 which is provided on the two side plates 41a of the horizontal cylindrical casing 41. Each adsorptive unit 44 is provided with several cylindrical adsorptive elements 46 with their bottom portions opened into the casing 41. A desorbed gas discharge pipe 47 is provided below the adsorptive unit 44a positioned at the lower part of the above rotary member 45. The upper opening of this desorbed gas discharge pipe 47 is freely brought into close contact with the lower surface of the said adsorptive unit 44a by the rising and descending actions of the oil pressure cylinder 48. The gas contaminated with harmful substances which has been introduced into the casing 41 from the gas inlet 49 positioned on the upper part of the casing 41 flows outward from the inside of each adsorptive element 46 of five adsorptive unit 44, and the purified gas is led out from the gas outlet 50 provided on the side plate. Also, the heated air introduced from the heated air duct 51 connected with the side plate 41a of the casing 41 is led into the adsorptive unit 44a located on the lower portion of the rotary member 45 to desorb the harmful gas which has been adsorbed through the adsorptive unit 44 in the reverse manner to the above, and the desorbed harmful substance is discharged through the harmful gas discharge pipe 47 to the harmful substance storage tank 52. Then, the rotary member 45 is intermittently moved by the distance of one adsorptive unit only, as in the case of the foregoing embodiment.

Thus, in the present invention, the each element in the present apparatus acts one another in a multiplied manner to exhibit the high capacity of the present apparatus. By using the cloth-like or sheet-like adsorptive material made of the specific active carbon fibers and by making the frame/adsorptive material area ratio not less than 2, there is obtained an adsorptive unit having a large ratio of the life to the pressure loss, and further, by preparing the cylindrical or bag-shaped adsorptive element from the cloth like or sheet-like adsorptive material, the regeneration time of the adsorptive material can be reduced. Moreover, by passing forcibly the heated purging gas through the adsorptive element, the heat efficiency can be enhanced, which also contributes to the reduction of the regeneration time of the adsorptive material. These excellent effects are overall combined to give the desired apparatus having a small pressure loss and a large capacity for treating the gases contaminated with harmful substances.

The preparation of the adsorptive materials and the apparatus of the present invention and the method for treating the gases contaminated with harmful substances by using the apparatus are illustrated by the following Examples.

EXAMPLE 1

Manufacturing conditions and characteristics of active carbon fiber fabrics are shown in Table 1, and the structures of the adsorptive element made of the active carbon fiber are shown in Table 2.

Table 1

| | A1 | A2 | A3 |
|---|---|---|---|
| Manufacture of active carbon fiber | | | |
| Material | 7.1d polynosic nonwoven fabric (needle punch) | 2d polynosic nonwoven fabric (needle punch) | 3d acrylonitrile nonwoven fabric |
| Flame retarding agent | $(NH_4)_2HPO_4$ 10 % | $(NH_4)_2HPO_4$ 1 % | $(NH_4)_2HPO_4$ 10 % |
| Flame retarding treatment | 263° C × 30 min. (in $N_2$) | 263° C × 30 min. (in $N_2$) | 263° C × 30 min. (in $N_2$) |
| Activation treatment | 907° C × 30 min. (in $N_2$) activation by steam | 907° C × 30 min. (in $N_2$) activation by steam | 1012° C × 30 min. (in $N_2$) activation by steam |
| Characteristics of fiber | | | |
| Weight per square meter | 244 g/m$^2$ | 248 g/m$^2$ | 252 g/m$^2$ |
| Equilibrated adsorption amount of benzene | 548 mg/g | 261 mg/g | 420 mg/g |
| Adsorption rate constant of benzene | 1.50 /min. | 0.32 /min. | 0.78 /min. |
| Fiber strength | 3.2 g/d | 1.4 g/d | 1.2 g/d |

Table 2

| | B1 | B2 | B3 |
|---|---|---|---|
| Sheet of fabric | 1 | 1 | 1 |
| Arrangement of fabric | Folded type | Flat type | Bag type |
| Frame area | 60cm × 60cm | 60cm × 60cm | 60cm × 60cm |
| Frame/adsorptive material area ratio | 8.3 | 1.0 | 38 |
| 0.1 m/second pressure loss | 2.6 mm Aq/cm | 2.6 mm Aq/cm | 2.6 mm Aq/cm |

Table 3

| | a1 | a2 | a3 |
|---|---|---|---|
| Kind of active carbon | Coconut shell active carbon | Granular active carbon | Particle active carbon |
| Equilibrated adsorption | | | |

Table 3-continued

|  | a1 | a2 | a3 |
|---|---|---|---|
| amount of benzene | 295 mg/g | 296 mg/g | 283 mg/g |
| Adsorption rate constant of benzene | 0.027 /min. | 0.014 /min. | 0.10 /min. |

Table 4

|  | b1 | b2 | b3 |
|---|---|---|---|
| Arrangement of adsorptive element | Flat type active carbon | Zigzag type active carbon | Folded type active carbon bonded to urethane foam sheet of 5 mm thick |
| Weight of active carbon | 10.0 kg/m$^2$ | 5.0 kg/m$^2$ | 2.5 kg/m$^2$ |
| Frame area | 60cm × 60cm | 60cm × 60cm | 60cm × 60cm |
| Frame/adsorptive material area ratio | 1.0 | 2.0 | 8.3 |

The results of the adsorption tests on various adsorptive elements made by combining the adsorptive materials as shown in Tables 1 and 3 with the structure of the adsorptive materials as shown in Tables 2 and 4, respectively, are shown in Table 5.

Table 5

| Experiment No. | Adsorptive element composition | Harmful substance containing air | | | Characteristics of adsorptive element | | |
|---|---|---|---|---|---|---|---|
|  |  | Harmful substance | Concentration of harmful substance (ppm) | Flow rate of air (m$^3$ min.) | Pressure loss (mm Aq) | Life (minute) | (Life/pres-* sure loss) index |
| Exp. 1 | A1 - B1 | Ozone | 1 | 21.6 | 3.2 | 22300 | 100 |
| Comp. exp. 1 | a1 - b1 | " | " | " | 148 | 1800 | 0.2 |
| Exp. 2 | A1 - B1 | Formaldehyde | 10 | " | 3.4 | 1900 | 100 |
| Comp. exp. 2 | a1 - b1 | " | " | " | 143 | 200 | 0.2 |
| Exp. 3 | A1 - B1 | Benzene | 100 | 108 | 15.7 | 40 | 100 |
| Exp. 4 | A3 - B1 | " | " | " | 24.1 | 33 | 54 |
| Exp. 5 | A1 - B2 | " | " | " | 3.4 | 210 | 2400 |
| Comp. Exp. 3 | A2 - B1 | " | " | " | 16.1 | 8 | 25 |
| Comp. Exp. 4 | A1 - B2 | " | " | " | 103 | 5 | 2 |
| Comp. Exp. 5 | a1 - b2 | " | " | " | 185 | 2 | 0.5 |
| Comp. Exp. 6 | a1 - b3 | " | " | " | 22.4 | 3 | 5 |
| Comp. Exp. 7 | a2 - b3 | " | " | " | 26.8 | 3 | 4 |
| Comp. Exp. 8 | a3 - b3 | " | " | " | 58.9 | 4 | 2.5 |

[Note]:
*The index is shown by the relative proportion when the ratio of life/pressure loss of the adsorptive element of A1-B1 is taken as 100.

EXAMPLE 2

A sheet of nonwoven fabric (needle-punched, weight per aquare meter: 500 g/m$^2$, thickness: 10 mm, 0.1 m/sec. pressure loss: 0.35 mm Aq/cm) is prepared from active carbon fibers (5 denier filaments) having an equilibrated adsorption amount of benzene of 560 mg/g and an adsorption rate constant of benzene of 1.5 /minute, which is made of a rayon. The sheet is formed to a cylindrical shape (inner diameter: 90 mm, thickness of the adsorptive layer: 60 mm, length: 900 mm) as shown in FIG. 2. An adsorptive unit as shown in FIG. 3 is prepared by using the above-obtained cylindrical adsorptive element, wherein the adsorptive unit is provided with 9 cylindrical adsorptive elements. The ratio of the area of the adsorptive material to the area of the unit frame is 4.4.

An apparatus is composed by using two adsorptive units obtained above. The heated purging gas (steam) is jetted for the desorption with a cap on the adsorptive element as shown in FIG. 7.

As another embodiment, cylindrical adsorptive elements (inner diameter: 80 mm, thickness of the adsorptive layer: 60 mm, length: 600 mm) are prepared from the same adsroptive sheet as above, from which an another type of apparatus as shown in FIGS. 9 and 10 is composed. The ratio of the area of the adsorptive material to the area of the unit frame is 3. In this apparatus, steam is used as the heated purging gas, too.

EXAMPLE 3

An adsorptive element is prepared from an adsorptive material of a nonwoven fabric (thickness: 5 cm, 0.1 m/sec pressure loss: 0.28 mm Aq/cm) which consists of active carbon fibers having an equilibrated adsorption amount of benzene of 550 mg/g and an adsorption rate constant of benzene of 1.3 /minute, said nonwoven fabric formed into a cylindrical shape (outer diamer: 18 cm, length: 60 cm, weight: 500 g) and fixed to the outside of a wire fabric.

Three adsorptive elements obtained above are fitted to one of the adsorptive unit made by radially dividing the rotary member (diameter: 160 cm, height: 120 cm) into equal parts. In this case, the ratio of the area of the adsorptive material to the area of the filter frame is 5. Into the above treatment system, a gas contaminated with harmful substance (toluene content: 340 ppm, temperature: 40° C) is introduced at the rate of 200 m/minute, and the system is moved rotatively by one adsorptive unit portion (angle of rotary movement 60°) at an interval of 4 minutes to let the five adsorptive units adsorb the harmful gas, and on the other hand steam is introduced into another adsorptive unit to give desorption at the temperature of 105° C at the steam rate of 1,500 g/minute, whereupon it is found that the toluene content of clean gas led out from the treating system is 5 ppm and the pressure loss is 68 mm Aq.

For comparison with the above adsorption system of the present invention, a fixed four-bath type adsorption system on the market is used to conduct a test on adsorption and desorption of the harmful substances in the same manner as done with the above example. An adsorption bath length 700 cm, width: 250 cm, height: 200 cm) is divided into four equal parts to form the adsortive units. For each adsorptive unit the adsorption system filled with granular active carbon (4 meshes, weight: 2,000 kg) is used. The same gas contaminated with harmful substance as that used in the above example is introduced on the same conditions and desorbed with steam at 130° C. As the results, the toluene content in the clean gas is 15 ppm and the pressure loss is 300 mm Aq.

As apparent from the above results, the treatment system of the present invention has higher harmful substance adsorption rate and lower pressure loss, while the total volume of adsorptive unit of the present invention is about 1/6 of that of the fixed four-bath type adsorption system.

What is claimed is:

1. A method for treating gases containing harmful substance by using an apparatus provided with at least two adsorptive units composed of at least one adsorptive tubular element made of a fibrous sheet of adsorptive material having a 0.1 m/second pressure loss of not more than 15 mm Aq/cm, said adsorptive material consisting predominantly of active carbon fibers having an equilibrated adsorption amount of benzene of not less than 300 mg/g and an adsorption rate constant of benzene of not less and 0.2 /minute, and the ratio of the area of said adsorptive material to the area of the unit frame being not less than 2, which comprises passing gases contaminated with the harmful substances through the adsorptive element in one of said adsorptive units, thereby adsorbing the harmful substances with said adsorptive material to recover a purified gas, and forcibly passing a heated purging gas through the adsorptive element in another one of the adsorptive units where the harmful substance had been previously adsorbed, said heated purging gas being jetted from a heated purging gas jetting device provided at the upper part of the adsorptive element in said another adsorptive unit, whereby the harmful substance-adsorbed by the adsorptive element is heated and desorbed, said adsorptive units being sequentially used for adsorption and desorption, respectively 2. The method according to claim 1, wherein the adsorptive element is in the form of a cylinder.

3. The method according to claim 1, wherein the active carbon fibers are produced by incorporating fibers selected from the group consisting of cotton, hemp, regenerated cellulose fiber, polyvinylalcohol fiber, acrylic fiber, aromatic polyamide fiber, crosslinked formaldehyde fiber, lignin fiber, phenolic fiber and petroleum pitch fiber with a flame retarding agent selected from the group consisting of $H_2PO_4$, $(NH_4)_2HPO_4$, tetrakis(hydroxymethyl)phosphonium salt, $ZnCl_2$ and $CoCl_2$ and subjecting the resulting fibers to a flame retarding treatment at a temperature not exceeding 400° C and converting the resultant fibers into active carbon fibers at a temperature of not less than 500° C.

4. The method according to claim 1, wherein the cloth-like or sheet-like adsorptive material is piled on a reinforcing material selected from the group consisting of a coarse nonwoven fabric and a coarse wire fabric to form the adsorptive element.

5. The method for treating gases containing harmful substances according to claim 8, wherein the flow direction of the heated purging gas used for the desorption is conveyed in the reverse flow direction to that of the gas to the adsorbed.

6. The method for treating harmful substance containing gases according to claim 1, wherein the heated purging gas is a member selected from the group consisting of saturated steam, superheated steam, heated inert gas and heated air.

* * * * *